(12) United States Patent
Gilfix et al.

(10) Patent No.: US 9,152,942 B2
(45) Date of Patent: Oct. 6, 2015

(54) USING A GROUP LIST SERVER AS A SYNDICATION FEED SERVER

(75) Inventors: Michael A. Gilfix, Austin, TX (US);
Victor S. Moore, Lake City, FL (US);
Mark Pozefsky, Chapel Hill, NC (US);
Susan Renee Wallenborn, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2116 days.

(21) Appl. No.: 11/833,790

(22) Filed: Aug. 3, 2007

(65) Prior Publication Data

US 2009/0037533 A1 Feb. 5, 2009

(51) Int. Cl.
*G06F 15/16* (2006.01)
*G06Q 10/10* (2012.01)
*H04L 29/08* (2006.01)

(52) U.S. Cl.
CPC .............. *G06Q 10/10* (2013.01); *H04L 67/00* (2013.01); *H04L 67/26* (2013.01)

(58) Field of Classification Search
CPC ......... H04L 67/18; H04L 69/28; H04W 4/02; H04W 64/003
USPC .......................... 709/205, 217, 223; 707/3, 10
See application file for complete search history.

(56) References Cited

U.S. PATENT DOCUMENTS

| | | | |
|---|---|---|---|
| 6,961,723 B2 | 11/2005 | Faybishenko et al. | |
| 7,013,303 B2 | 3/2006 | Faybishenko et al. | |
| 7,099,871 B2 | 8/2006 | Faybishenko et al. | |
| 7,363,339 B2 * | 4/2008 | Delany et al. | 709/202 |
| 2004/0015562 A1 * | 1/2004 | Harper et al. | 709/217 |
| 2006/0253567 A1 * | 11/2006 | Selin et al. | 709/224 |
| 2007/0026883 A1 * | 2/2007 | Sung et al. | 455/518 |
| 2008/0010294 A1 * | 1/2008 | Norton et al. | 707/10 |
| 2008/0052372 A1 * | 2/2008 | Weber et al. | 709/217 |
| 2008/0065701 A1 * | 3/2008 | Lindstrom et al. | 707/201 |

FOREIGN PATENT DOCUMENTS

JP 2006059032 A 3/2006

OTHER PUBLICATIONS

Jing, et al., "Client-Server Computing in Mobile Environments," ACM Computing Surveys, vol. 31, No. 2, Jun. 1999.
Berendt, B., et al., "Analysis of navigation behavior in Web sites integrating multiple information systems," The VLDB Journal, vol. 9, No. 1, pp. 56-75, 2000.
Krishnamurthy, B., et al., "Design, implementation, and evaluation of a client characterization driven web server," Proc. of 12th Int'l. Conf. on World Wide Web, pp. 138-147, 2003.
Krishnamurthy, B., et al., "Improving web performance by client characterization driven server adaptation," Proc. of Int'l. Conf. on World Wide Web, pp. 305-316, 2002.
"Standard web browser and rich site summary combining method for online news distribution, involves executing query and returning as formatted web page, where response page always contains link with rich site summary feed URL," Research Disclosure No. 508104A, Aug. 10, 2006.

* cited by examiner

*Primary Examiner* — Asad Nawaz
*Assistant Examiner* — Stephanie Chang
(74) *Attorney, Agent, or Firm* — Patents on Demand P.A.; Brian K. Buchheit; Scott M. Garrett

(57) ABSTRACT

The present invention discloses a solution for modifying a group list server to perform syndication feed operations. A syndication feed creation software component, a content gathering component, and a content extraction converting component can be added to a group list server. The modified group list server can continue to function as a traditional list server and can also function as a traditional feed server that is able to interoperate with standard, client-side feed readers. In one embodiment, the modified list server can repurpose syndication groups as to operate as syndication feed channels and can repurpose group members to operate as feed items.

17 Claims, 3 Drawing Sheets

USING A GROUP LIST SERVER AS A SYNDICATION FEED SERVER

BACKGROUND

1. Field of the Invention

The present invention relates to the field of network publications through a feed service and, more particularly, to using a group list server as a syndication feed server.

2. Description of the Related Art

Conventionally, list management servers and syndication feed servers are special purpose servers—each serving a different function, each using different protocols and conventions, each being implemented by separate server software, and each being used by separate client software. To elaborate, a list management server traditionally is used to create and manage network-based group definitions and associated lists of members for defined groups. The list management server can maintain access lists, permissions, and other service specific properties associated with groups and group members. Use of a list management server permits a user's contact list, such as an email list or a personal address book, to be specified and used in an application independent manner. This can allow a user's contact list to be used by an email program at work and at home, by a mobile telephony device of the user, and the like. List management servers also support group list nesting so that one list can be referenced within another. The list management server further permits multiple users to share lists, such as sharing contact lists among employees in a company. Numerous standards exist to ensure compatibility of server managed lists, such as the XML Configuration Access Protocol (XCAP) standard of the Internet Engineering Task Force (ETF).

In contrast, a syndication server permits users to subscribe to syndication feeds. A syndication feed, such as a Really Simple Syndication (RSS) or an Atom Syndication Format (ATOM) feed, are used to provide items containing short descriptions of Web content together with a link to a full version of the content and/or with a text version of the full content. Syndication feeds are used to publish frequently updated content, such as BLOG entries, news headlines, or podcasts. Feed content can be read using a feed reader or an aggregator. That is, users subscribe to a feed by entering the feed's link into the reader. The reader regularly checks subscribed feeds for new content and downloads any new content related to these feeds.

FIG. 1 (Prior Art) is included to pictorially illustrate conventional implementations of a feed server shown in arrangement 110 and a list server shown in arrangement 150. In the prior art feed server arrangement 110, a client 120 can subscribe to a feed server 130 that provides syndication feeds. The feed server 130 can gather content from one or more Web sources 140. For instance, one or more Web servers 140 can provide Hyper Text Markup Language (HTML) pages to the feed server 130 responsive to server 130 issued requests. The feed server 130 can utilize a converter 132 to extract content from the HTML pages and to repackage it into an XML format. The repackaged content can differ from the original content in that it no longer includes presentation information, but only content. Users of interface 122 can trigger a poll event to one or more feed servers 130 which results in a streamed update. The update can contain any content corresponding to the subscription that the server 130 has received since a last poll. A single client 120 can include an aggregator 124 component that combines content from multiple feed servers 130 into a user configured view. Aggregation can also occur within a Web server (not shown) that provides feed content to client 120.

In the group list server arrangement 150, different communication nodes 160 can each connect to a list management server 172 via network 170. Each node 160 can include a user 162-164 and a computing device 166-168. The same user 162-164 can use the list management server 172 as a central repository for storing contact information used by multiple different devices 166-168. Further, different users 162-164 can share a common set of server 172 maintained information, such as sharing updated business contact information among a set of business agents. The list management server 172 can maintain and use a set of list server tables 180. These tables 180 can include a group table 182, a participant table 186, and a linkage table 184, which links the group 182 and participant tables 186. The group table 182 can maintain information concerning the groups that the list server 172 manages, such as a group id, a group name, a description and other attributes. The participant table 186 can maintain information concerning group members, such as a participant id, name, device address, and status. The linkage table 184 can associate group table 182 items to participant table 186 items in a many-to-many relationship.

SUMMARY OF THE INVENTION

The present invention discloses a solution for modifying a group list server to perform syndication feed operations in accordance with an embodiment of the inventive arrangements disclosed herein. More specifically, a syndication feed creation software component, a content gathering component, and a content extraction converting component can be added to a group list server. The modified group list server can continue to function as a traditional list server and can also function as a traditional feed server, able to interoperate with standard, client-side feed readers. In one embodiment, the modified list server can repurpose syndication groups to operate as syndication feed channels and can repurpose group members to operate as feed items. The disclosed solution permits security, management, scalability, reliability, and performance of a group list server to be directly applied to a syndication feed environment.

The present invention can be implemented in accordance with numerous aspects consistent with the material presented herein. For example, one aspect of the present invention can include a group list server that includes list management software and syndication feed software, both of which can be stored in a machine readable medium and which include a set of programmatic instructions that are executable by a machine. The list management software can manage network-based group definitions and lists of members for defined groups. The syndication feed software can serve syndication feeds to remotely located clients.

Another aspect of the present invention can include a system for providing syndication feeds that includes an acquisition engine and a syndication engine. The acquisition engine can extract content from network servers and can place extracted content in a syndication format, which is stored in at least one group list table. Each group list table can correspond to a syndication channel. The syndication engine can serve syndication feeds to remotely located clients. The served syndication feeds are obtained from the group list tables. The remotely located clients can be standard syndication feed clients. Communications to/from the syndication feed clients can conform to at least one of a Really Simple Syndication (RSS) based protocol and an Atom Syndication Format (ATOM) based protocol.

Still another aspect of the present invention can include a method for handling syndication feeds. The method can include a step of identifying at least one syndication feed item associated with a syndication channel. The syndication channel can be represented as a list management server group. At least one syndication feed item in a group table managed by the list management server group can be stored by a list management server. The server can serve the stored syndication feed item to at least one syndication feed client responsive to a syndication feed request.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
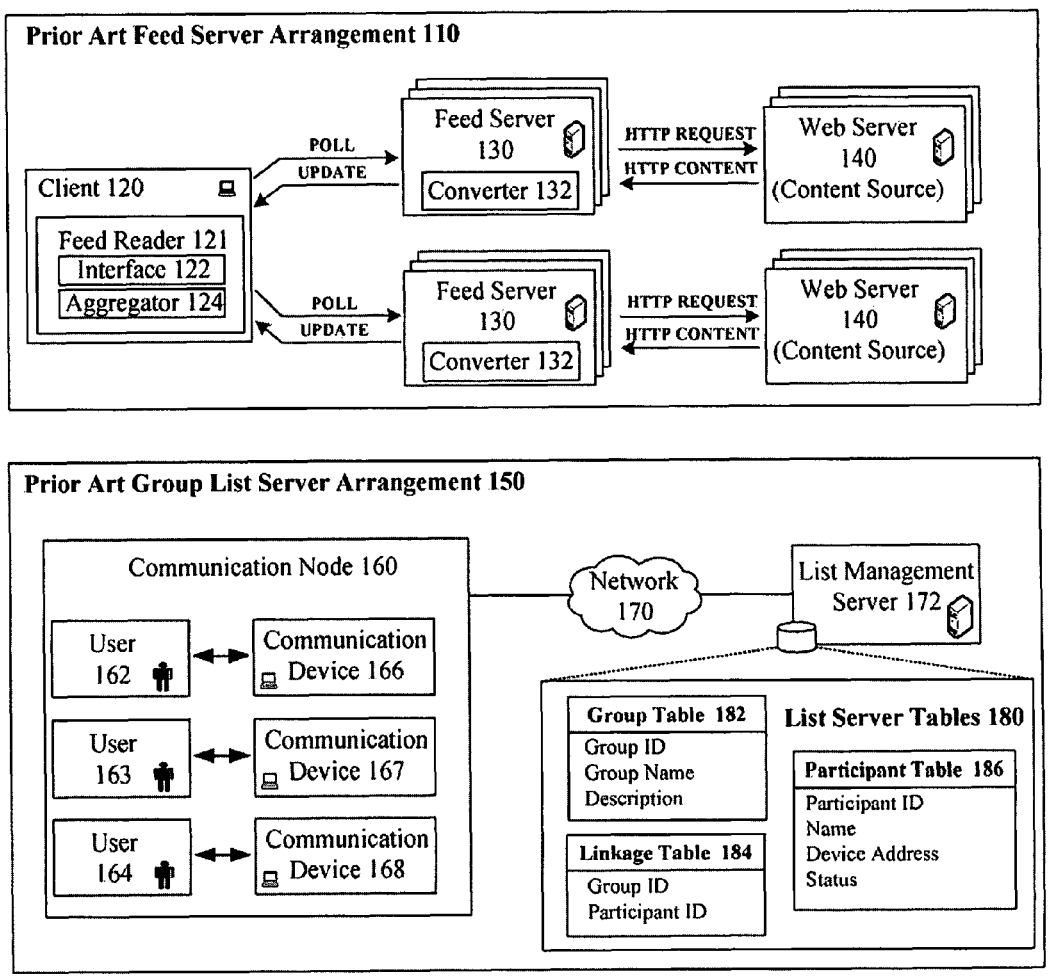
FIG. 1 (Prior Art) pictorially illustrates conventional implementations of a feed server and a list server.
Figure 2:
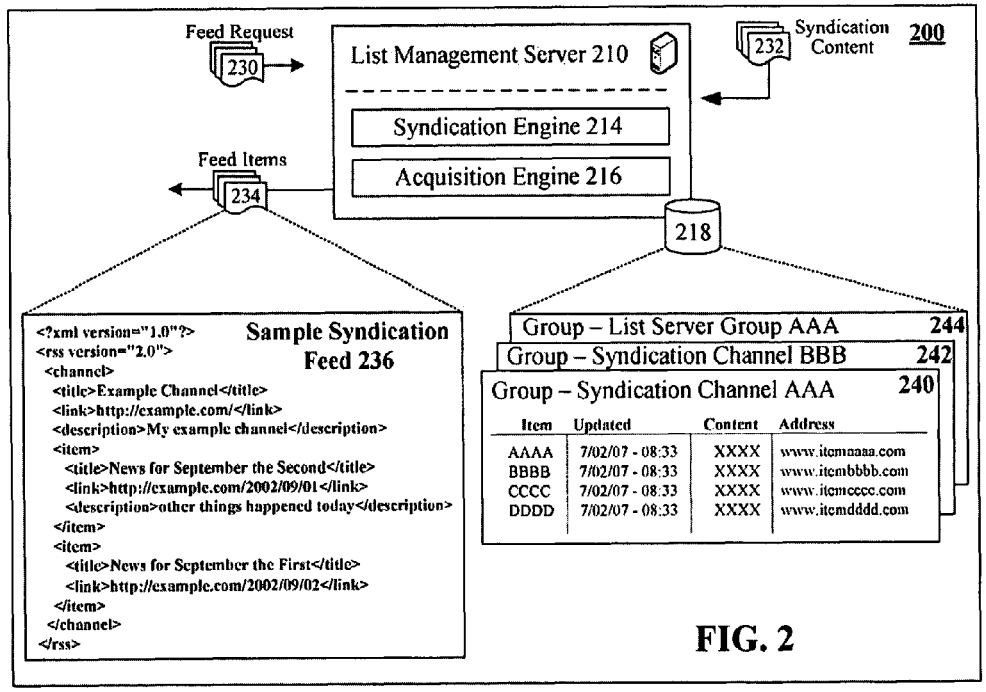
FIG. 2 is a schematic diagram of a system that includes a list management server having syndication feed server capabilities in accordance with an embodiment of the inventive arrangements disclosed herein.

FIG. 2 is a schematic diagram of a system 200 that includes a list management server 210 having syndication feed server capabilities in accordance with an embodiment of the inventive arrangements disclosed herein. The list management server 210 can maintain list server functionality. A syndication channel (240-242) can correspond to a list server group 244 and syndication items can correspond to group list elements. One of more software routines, such as a syndication engine 214 and an acquisition engine 216 can exist within the list management server 210. In one embodiment, these engines 214-216 can be plug-ins, such as JAVA servlets, that enhance a list management server 210. Although the engines 214 and/or 216 can be contained within the server 210, the engines 214 and/or 216 can also be located in one or more remote machines (not shown) that pre-/post-process information to/from the list management server 210. In one embodiment, the list management server 210 can be a standard commercial off-the-shelf (COTS) server.

The acquisition engine 216 can obtain syndication content 232 from remote network servers, can convert the content 232 to a syndication feed format, and can store the converted content 232 in a syndication channel table 240-242 of data store 218. Syndication formats of the stored syndication feed items can include a Really Simple Syndication (RSS) compliant format, an Atom Syndication Format (ATOM) compliant format, an Extensible Markup Language (XML) based syndication format, as well as other feed formats. Syndication of feeds refers to a publishing of frequently updated content such as blog entries, news headlines or podcasts. A syndication feed item or document is often referred to as a feed, a web feed, or a channel. One network location from which syndication content 232 can be extracted from can be a Web server, where the syndication content 232 is Web content. The invention is not to be construed as limited in this regard, however, and any content source can be used. Additionally, each syndication feed item can contain a summary of content from an associated Web site, the full text extracted from the Web site, and related data items.

For example, Syndication Channel AAA 240 can contain syndication feed items (e.g., AAAA, BBBB, CCCC, and DDDD) each having an associated update time, content, and source address. The Syndication Channel AAA 240 can be maintained in a repurposed group table, as is Syndication Channel BBB 242. Storing syndication channels within group tables 240-242 can occur in a non-interfering manner that does not affect operation of standard list server group tables 244.

The syndication engine 214 can accept feed requests 230 from remote clients. Each request 230 can be a request for all updates to a particular syndication channel that have occurred since a last update time. Recently updated feed items 234 can be provided in response to the requests 230. A sample syndication feed item 236 is shown as an XML document in RSS format that includes two items, one for 2002/09/01 and another for 2002/09/02.

Figure 3:
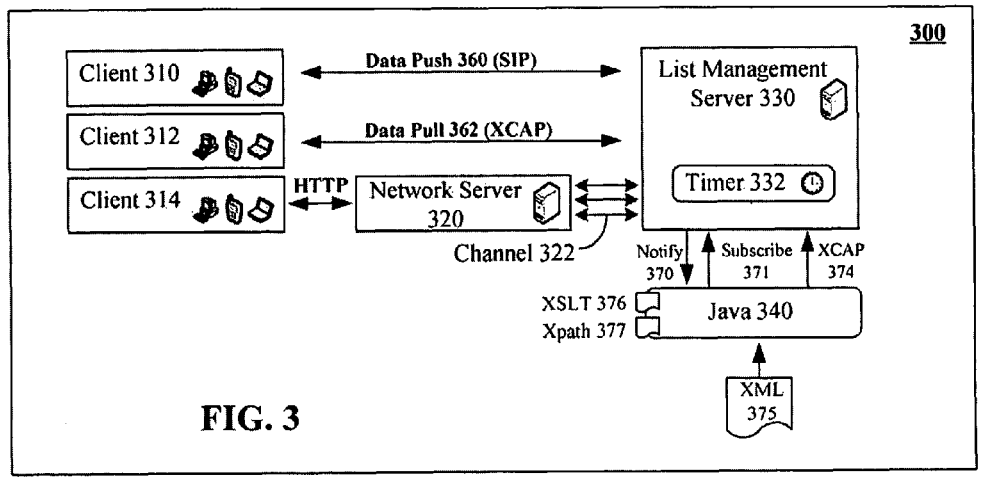
FIG. 3 is a schematic diagram of a system in which a list management server provides syndication feed data to one or more clients in accordance with an embodiment of the inventive arrangements disclosed herein.

In one embodiment, the requests 230 can originate from feed readers and/or feed aggregators contained in requesting clients. That is, the requests 230 can be standard requests from RSS or ATOM clients, which the list management server 210 can handle in accordance with the applicable standards (e.g., RSS or ATOM standards). Although compatible with existing syndication standards, the engines 214-216 provide a highly flexible solution that is able to be adapted to non-standard feed requesting techniques. For example, new feed request techniques, such as a Session Initiation Protocol (SIP) technique, can be implemented to permit any SIP compatible device to request and receive syndication feed items. In other words, system 200 can be a multi-channel access system for obtaining the feed items 234 from the server 210, where RSS (e.g., HTTP based access in general) is one "channel" or access technology for obtaining the feed items 234, SIP can be an access technology for another "channel", XML Configuration Access Protocol (XCAP) can be an access technology associated with yet another access channel (as illustrated in FIG. 3), and so forth.

As used herein, the list management server 210 can allow for the creation and management of network-based group definitions and associated lists for members of those groups. In one embodiment, the server 210 can be a generic XML document management server that is able to specify document lists used by member groups. The server 210, when enhanced by engines 214 and 216, can also handle syndication feeds. The list management server 210 can operate in accordance with numerous open standards, such as an XML Configuration Access Protocol (XCAP) based standard, an Open Mobile Alliance (OMA) XML Document Management Server (OMA XDMS) based standard, and the like. The list management server 210 can be implemented using numerous commercially available solutions, such as the GROUP LIST MANAGEMENT SERVER (GLM) for IBM IMS. The invention is not limited to being implemented in this fashion, however, and other solutions can be used including the NOKIA LIST MANAGEMENT SERVER, the HP OPENCALL XML DOCUMENT MANAGEMENT SERVER, and the like.

The data store 218 can be a physical or virtual storage space configured to store digital information. Data store 218 can be physically implemented within any type of hardware including, but not limited to, a magnetic disk, an optical disk, a semiconductor memory, a digitally encoded plastic memory, or any other recording medium. The data store 218 can be a stand-alone storage unit as well as a storage unit formed from a plurality of physical devices. Additionally, information can be stored within the data store 218 in a variety of manners. For example, information can be stored within a database structure or can be stored within one or more files of a file storage system, where each file may or may not be indexed for information searching purposes. Further, data store 218 can utilize one or more encryption mechanisms to protect stored information from unauthorized access.

The list management server 210 can be communicatively linked to one or more remotely located computing devices via a network (not shown) over which items 230-234 are digitally conveyed. The network can include any hardware/software/ and firmware necessary to convey data encoded within carrier waves. Data can be contained within analog or digital signals and conveyed though data or voice channels. The network can include local components and data pathways necessary for communications to be exchanged among computing device components and between integrated device components and peripheral devices. The network can also include network equipment, such as routers, data lines, hubs, and intermediary servers which together form a data network, such as the Internet. The network can also include circuit-based communication components and mobile communication components, such as telephony switches, modems, cellular communication towers, and the like. Additionally, the network can include line based and/or wireless communication pathways.

FIG. 3 is a schematic diagram of a system 300 in which a list management server 330 provides syndication feed data to one or more clients 310-314 in accordance with an embodiment of the inventive arrangements disclosed herein. The list management server 330 can be implemented in accordance with the details described in system 200: That is, system 300 represents one contemplated architecture for implementing a syndication feed solution. As shown in system 300, the list management server 330 provides multi-channel access using different access protocols, such as HTTP, SIP, and XCAP.

Specifics of system 300 are shown as being implemented using JAVA (340), SIP, XML configuration access protocol (XCAP), Extensible style sheet language transformation (XSLT), and/or XML Path Language (XPath) based technologies, standards, and formats, which are used for illustrative purposes only and are not intended to be limitations imposed on the invention. In different contemplated embodiments, C++, .NET, or other code languages can be substituted for any JAVA specific references, and other protocols/standards can replace SIP, XCAP, XSLT, XPath, and the like yet still be considered within a scope of the disclosed invention.

In system 300, the JAVA 340 component can read an XML file 375 that specifies the Uniform Resource Locators (URLs) of Hypertext Markup Language (HTML) pages that are to be converted to syndication channel content. Along with each URL, the XML file can indicate an XSLT 367 or XPath 377 document that is used to extract content from the HTML page. The content can be stored by the list management server 330 in a repurposed list group, which functions as a syndication channel. The URL for the HTML page can be saved as a group name and all URL links to the page can be saved as group members. The XSLT 376 or XPath 377 document can fetch from the page a title and description for each link. The documents 376-377 can also enrich the original HTML content by adding text of their own. The extracted title and description can be saved in the list management server 330 as attributes to the GLS member (URL) with which these elements correspond.

In one embodiment, the JAVA component 340 can subscribe 371 to the lists and can set a timer 332 so that the component 340 is notified 370 when a list should be refreshed. In addition to the timer 332 triggering a refresh event, the list can be refreshed whenever the JAVA component 340 or list management server 330 detects a change to the corresponding list. For instance, one of the clients 310-314 can update list content through the list management server 330.

Information managed by the list management server 330 can be accessed by different clients 310-314 in different manners. One manner is to push 360 updated data from a list management server 330 to clients 310, which subscribe to a related syndication feed. For example, SIP SUBSCRIBE/ NOTIFY interfaces and conventions can be used, where a client 310 subscribes to a syndication channel (e.g., group name) and is automatically NOTIFIED by the list management server 330 whenever that channel's data changes.

Another technique to acquire data from the list management server 330 is for a client 312 to pull 362 data from the server 330. For example, an RSS client can choose to use XCAP 374 to fetch a data channel. Unlike the SIP based technique (360), the client 312 must poll the server 330 for updates.

Still another technique for acquiring syndication data from server 330 is to utilize a convention syndication client 314 and access methodology. In other words, the client 314 can send an HTTP request to a Web server 320 for a syndication resource provided by server 330 that is associated with a syndication channel 322. The Web server 320 can execute a servlet that sends an XCAP 374 message to the group list server 330 to fetch the syndication channel 322 information. In another implementation, the server 320 can use a SIP based interface to communicate with the server 330. The Web server 320 can format the received data as an XML stream, which it conveys to the client 314.

Appreciably, clients 310-312 are non-traditional clients of syndication data in that they receive data from a syndication channel, which each of the receiving clients 310-312 internally organizes in this respect, client 314 can be a "true RSS" client, while clients 310-312 are not.

In system 300, each of the clients 310-314 can be any computing device capable of exchanging messages over a network. The clients 310-314 can include, but are not limited to, a computer, a small business server, a standard telephone, an SIP based telephone, a mobile telephone, a two-way radio, a personal data assistant, a media player, a video game entertainment system, a chat terminal, a wearable computing device, and the like. Various ones of the communication devices 310-314 can be capable of different communication modalities. For example, a computer (device 310-314) can be able to communicate using a Voice over Internet Protocol (VOIP) phone, a local application's Graphic User Interface (GUI), a Web interface, and the like. The syndication content from the list management server 330 can be obtained using any of these communication modalities.

Figure 4:
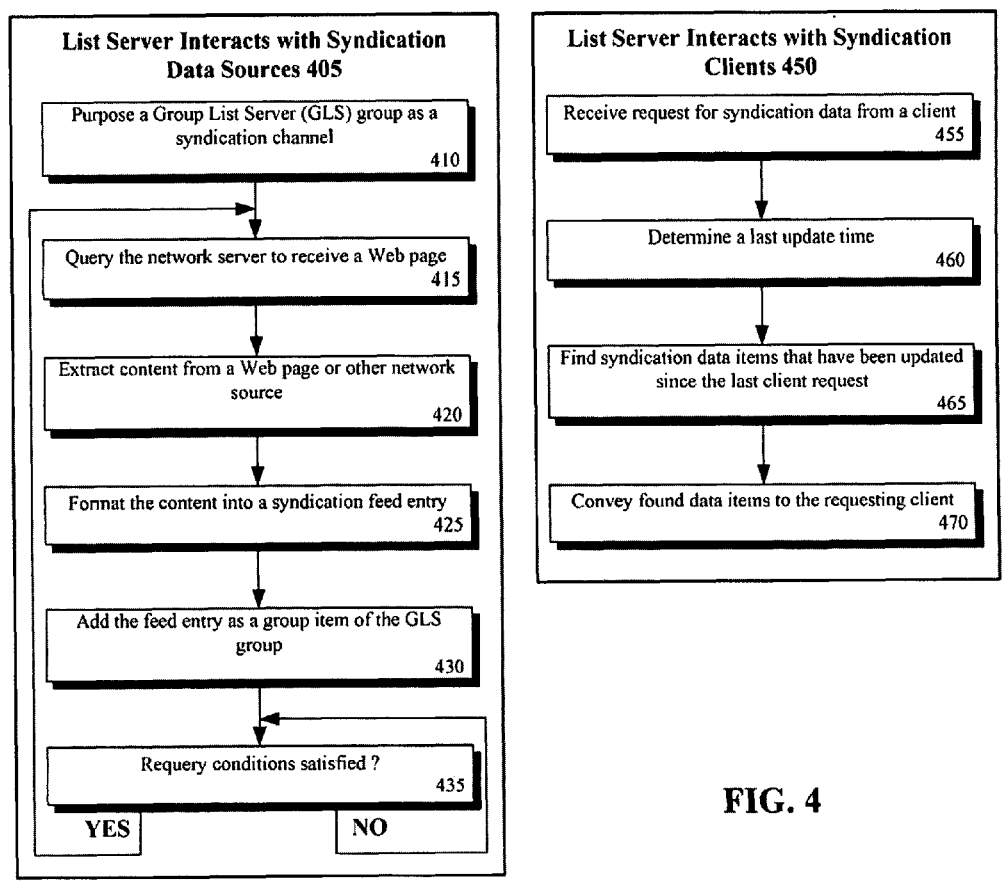
FIG. 4 is a flow chart of a method for utilizing a list server as a syndication feed server in accordance with an embodiment of the inventive arrangements disclosed herein.

FIG. 4 is a flow chart of a method 400 for utilizing a list server as a syndication feed server in accordance with an embodiment of the inventive arrangements disclosed herein. The method 400 includes a process 405 that shows a manner in which a list server interacts with syndication data sources. A different process 450 of method 400 shows a manner in which the list server interacts with syndication clients. The method 400 call be performed in the context of a system 200 or a system 300.

Process 405 can begin with a step 410, where a group list server (GLS) group can be treated or purposed as a syndication channel. In step 415, a network server can be queried to receive a Web page or other content. In step 420, content can be extracted. In step 425, extracted content can be converted/re-formatted into a proper format for a syndication feed entry. In step 430, the feed entry can be added as a group item for the GLS group. In step 435, a set of re-query conditions can be compared against a set of current system conditions. When re-query conditions are not satisfied in step 435, the method can wait for a delay period, at which point the re-query conditions of step 435 can be checked again. When the re-query conditions are satisfied, the process 405 can progress from step 435 to step 415, where the network server can be queried for updated content.

Process 450 can begin in step 455, where a request for syndication data can be received from a syndication feed client. In step 460, a last update time for the client can be determined. In step 465, the GLS group that has been purposed as a syndication channel can be searched to determine a set of syndication feed items that have been updated since the last request. In step 470, a set of discovered feed items since the last update can be conveyed to the requesting client. The process 450 can repeat for each syndication client and for each syndication request.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A group list server comprising:
list management software stored in a non-transitory machine readable medium configured to cause a commercial off-the shelf list management server executing the list management software to manage network-based group definitions and lists of members for defined groups;
syndication feed software stored in a non-transitory machine readable medium configured to cause the commercial off-the shelf list management server executing the syndication feed software to serve syndication feeds to remotely located clients; and
an acquisition engine, which is software stored in a machine readable format, configured to cause the commercial off-the shelf list management server to fetch Web pages from Web servers, to extract the content from those pages, and to format the content in accordance with a feed format supported by the syndication feed software, wherein security, management, scalability, reliability, and performance of the group list server are directionally applied to a syndication feed environment thought the inclusion of syndication feed functionality in the group list server, wherein the syndication feed software and the acquisition engine are plug-ins for the commercial off-the-shelf list management server comprising hardware and software, where the plug-ins add a syndication feed capability to the group list server.

2. The group list server of claim 1, wherein a syndication feed creation software component, a content gathering component, and a content extraction converting component are all component of the group list server, which handle syndication feed functions, wherein the syndication feeds conform to at least one of a Really Simple Syndication (RSS) based protocol and an Atom Syndication Format (ATOM) based protocol.

3. The group list server of claim 1, wherein the syndication feed software and the acquisition engine are each JAVA servlets.

4. The group list server of claim 1, wherein the syndication feed software repurposes list server groups to function as syndication feed channels, and wherein the syndication feed software repurposes list server group elements to function as syndication feed items.

5. The group list server of claim 1, wherein the group list server is configured so that clients are able to subscribe to syndication channels, where subscribing clients automatically receive content from the group list server as updates occur.

6. The group list server of claim 5, wherein a Session Initiation Protocol (SIP) based communication protocol is used for communications between the group list server and the clients, and wherein SIP SUBSCRIBE commands are used for establishing subscriptions for a syndication channel managed by the group list server and SIP NOTIFY commands are used to convey feed information to subscribing clients.

7. The group list server of claim 1, wherein a group list server communicates with syndication channel clients using XML configuration access protocol (XCAP) based messages.

8. A method for handling syndication feeds comprising:
fetching, by a commercial off-the-shelf list management server running a plug-in that adds syndication feed capability, Web pages from Web servers;

extracting, by the commercial off-the-shelf list management server, content of those Web pages;
formatting, by the commercial off-the-shelf list management server, the content in accordance with a feed format supported by syndication feed software of the commercial off-the-shelf list management server;
identifying, by a commercial off-the-shelf list management server, at least one syndication feed item associated with a syndication channel, said item resulting from the formatting;
representing, by the commercial-off-the-shelf list management server, the syndication channel as a list management server group managed by the commercial-off-the-shelf list management server;
storing, by the commercial-off-the-shelf list management server, the at least one syndication feed item in a group table managed by the commercial-off-the-shelf list management server; and
the commercial-off-the-shelf list management server serving the stored syndication feed item to at least one syndication feed client responsive to receiving a syndication feed request, wherein security, management, scalability, reliability, and performance of the commercial-off-the-shelf list management server are directionally applied to a syndication feed environment thought the inclusion of syndication feed functionality in the commercial-off-the-shelf list management server.

9. The method of claim 8, further comprising:
storing a plurality of group list items in associated groups managed by the list management server;
receiving requests from group list clients; and
the group list server responding to the requests by providing request satisfying ones of the plurality of list items to the requesting clients.

10. The method of claim 8, wherein the syndication feed client is a standard Really Simple Syndication (RSS) client, wherein the Really Simple Syndication (RSS) client remains unaware that the served syndication feed item is being managed by a list management server instead of being managed by a standard Really Simple Syndication (RSS) server.

11. The method of claim 8, further comprising:
receiving Web content from a Web source; and
extracting information from the Web content to create the at least one syndication feed item.

12. The method of claim 11, further comprising:
identifying at least one of an extensible style sheet language transformation (XSLT) and an XML Path Language (XPath) document, wherein said extracting step is performed in accordance with specifications of the identified at least one extensible style sheet language transformation (XSLT) and XML Path Language (XPath) document.

13. The method of claim 8, further comprising:
receiving a Session Initiated Protocol (SIP) formatted request for syndication channel information, wherein the serving step serves the syndication feed item to SIP enabled clients using SIP formatted messages.

14. The method of claim 8, further comprising:
receiving an XML configuration access protocol (XCAP) formatted request for syndication channel information, wherein the serving step serves the syndication feed item requesting clients using XCAP formatted messages.

15. The method of claim 8, wherein said steps of claim 10 are performed by at least one machine in accordance with at least one computer program stored in a computer readable media, said computer programming having a plurality of code sections that are executable by the at least one machine.

16. A system for providing Web feeds comprising:
acquisition engine, which is software stored in a machine readable format, configured to cause a commercial off-the shelf list management server to fetch Web pages from Web servers, to extract the content from those pages, and to format the content in accordance with a feed format supported by syndication feed software, wherein security, management, scalability, reliability, and performance of the group list server are directionally applied to a syndication feed environment thought the inclusion of syndication feed functionality in the group list server, wherein the commercial-off-the-shelf list management server stores the formatted content in at least one group list table, each group list table corresponding to a syndication channel; and
syndication engine, which is a plug-in of the commercial off-the shelf list management server that serves Web feeds to remotely located clients, wherein said served Web feeds are obtained from said at least one group list table, wherein the remotely located clients are standard syndication feed clients, wherein communications to/from the syndication feed clients conform to at least one of an Really Simple Syndication (RSS) based protocol and an Atom Syndication Format (ATOM) based protocol, wherein the syndication engine and the acquisition engine are plug-ins for the commercial off-the-shelf list management server comprising hardware and software, where the plug-ins add a syndication feed capability to the commercial-off-the-shelf list management server, wherein security, management, scalability, reliability, and performance of the commercial-off-the-shelf list management server are directionally applied to a syndication feed environment thought the inclusion of syndication feed functionality in the commercial-off-the-shelf list management server.

17. The system of claim 16, wherein the group list table is managed by the commercial-off-the-shelf list management server, said commercial-off-the-shelf list management server being configured to manage network-based group definitions and lists of members for defined groups.

* * * * *